G. H. CARTER.
CAR FENDER.
APPLICATION FILED FEB. 18, 1909.
936,703.
Patented Oct. 12, 1909.
2 SHEETS—SHEET 1.
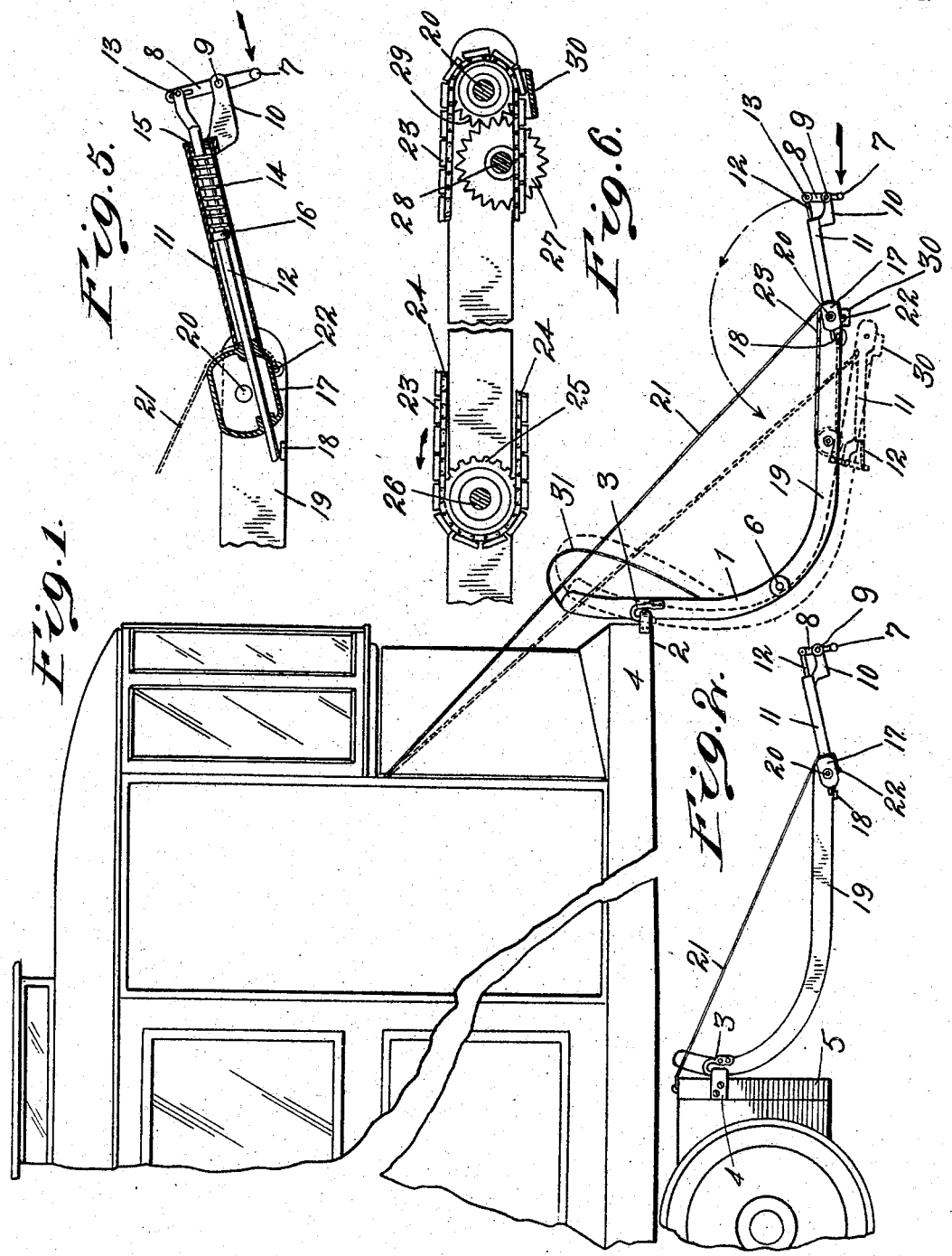
Witnesses:
Harry Herbig
Adolph ___
Inventor
George Heber Carter
By his Attorneys
Dunn & Fink

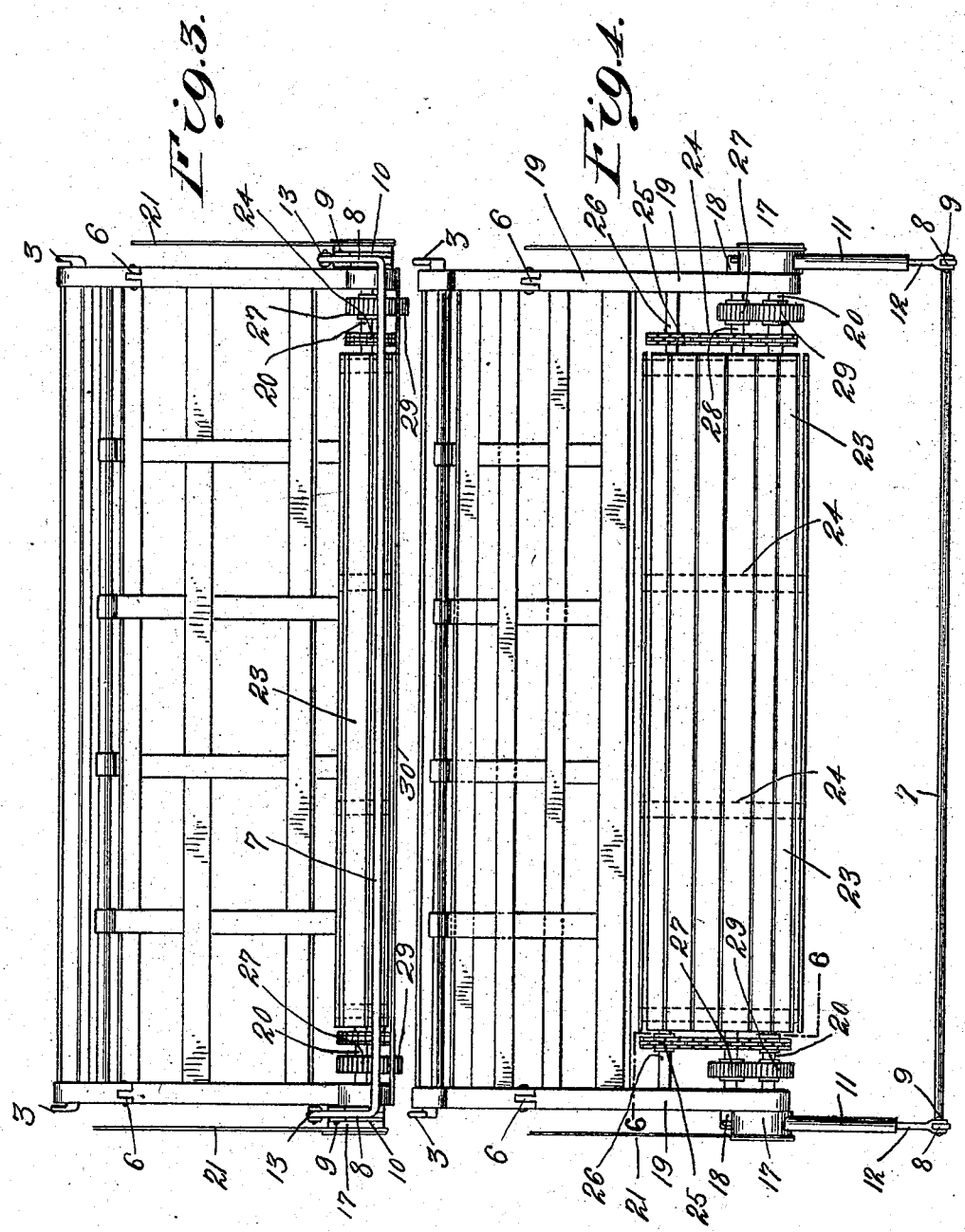

UNITED STATES PATENT OFFICE.

GEORGE HEBER CARTER, OF NEW YORK, N. Y., ASSIGNOR OF FORTY-FIVE ONE-HUNDREDTHS TO JOHN T. SHERLOCK, OF NEW YORK, N. Y.

CAR-FENDER.

936,703.  Specification of Letters Patent.  Patented Oct. 12, 1909.

Application filed February 18, 1909. Serial No. 478,645.

*To all whom it may concern:*

Be it known that I, GEORGE HEBER CARTER, a subject of the King of Great Britain, residing at Richmond Hill, in the city of New York, borough and county of Queens and State of New York, have invented certain new and useful Improvements in Car-Fenders, of which the following is a full, clear, and exact specification.

My invention relates to improvements in car fenders.

The objects of my improvement are: first, to provide tripping mechanism whereby the fender is lowered upon impact with some object, as a person, in front of the car; second, to provide means whereby such person will be conveyed to the basket of the fender; and these and other objects, which will appear in the following description, I attain by the devices illustrated in the accompanying drawings, in which—

Figure 1 is a side elevation of my device attached to the front platform of a car. Fig. 2 is a similar view of the device, somewhat reduced in height, as applied to a car truck. Fig. 3 is a front elevation of the device of Fig. 1. Fig. 4 is a plan view of the same. Fig. 5 is a detail, partly in section, of the fender-lowering device; and Fig. 6 is a detail of the conveyer.

The fender 1 may be attached to the front platform 2 of the car body by hooks and eyes 3, 4, as shown in Fig. 1, or it may be attached in a similar manner directly to truck 5, as shown in Fig. 2, in which latter case the height of the upright part of the fender will be somewhat less than it is where the fender is attached to the front platform, to permit it readily to pass under the car body. Such method of attachment permits the forward end of the fender to be lowered, and other means of attachment permitting such movement may be employed if desired. The fender may be hinged, as at 6, to permit it to be folded up out of the way when desired.

I will first describe the tripping mechanism by which the fender may be automatically released and lowered when it is required: Attached to the front of the fender is a double crank-rod 7 (Fig. 3), the bent arms 8 of which are journaled at 9 in brackets 10 of the swinging hollow arms 11, of which there are two, one on each side of the fender, and which act as supports for the crank-arm.

Longitudinally-movable triggers 12 are connected to arms 8 by a pin and slot connection at 13, so as to permit crank-arms 8 to turn freely, and these triggers extend through the hollow arms 11, and are spring-pressed rearwardly by the coiled spring 14 (Fig. 5) bearing against the forward walls 15 of the hollow arms 11, and also against collars 16 fixed upon triggers 12. By means of said spring the double crank-rod is maintained in position despite jarring. The triggers 12 project rearwardly outside of hollow hubs 17, attached to arms 11, and their rear ends engage stops 18, which are fixed upon the lower part of the forward ends of the side frames 19 of the fender. Hubs 17 are journaled loosely upon the ends of a shaft 20, which has bearings in side frames 19, and project outside of same. Supporting-straps or cords 21 are attached to the car and pass around the periphery of hubs 17, which are enlarged for the purpose, and are fastened to the under side thereof at 22. Said cords might, if desired, be attached directly to the hollow arms 11.

What I designate as the conveyer is situated at the forward part of the fender, to the rear of the double crank-rod, and comprises a series of slats 23, supported on sprocket chains 24, and passing around sprocket wheels 25, which are fixed to shafts 20, 26, journaled in the side frames 19. Spur gears 27 revolve loosely upon a shaft 28, fixed in the side frames 19, and project below the lower parts of said frames to engage the ground. They mesh in other spur gears 29, which are fixed upon shaft 20, carrying the sprocket wheels 25. A guard rail 30 is attached to side frames 19 and passes under spur gears 29 to protect said spur gears from interference or injury, as by stones, etc.

I have attached to the upper part of my fender a cushion 31, which extends across the fender and is designed to soften the shock to any person that may be thrown violently into the fender, and which may be made of suitable material.

In operation my device will be lowered and supported by ropes 21. The triggers will then be set with their rear ends above the stops 18, and they will be maintained in this position by the weight of the fender borne by ropes 21, which pass around hubs 17 and tend to press the triggers against the stops.

The fender, when the trigger is set, is maintained in position some distance, about six inches, for instance, above the ground, so as to clear small inequalities, stones, etc., as shown by full lines in Fig. 1. Upon the crank-rod 7 striking against a person on the track, it is immediately pushed back, releasing the triggers and causing said rod to fly to the rear in a path illustrated by arrows in Fig. 1. The revolution of hubs 17 lowers the fender to position shown by dotted lines in Fig. 1, so that spur gears 27 rest upon the ground and are turned, and through the spur gears 29 and sprockets 25, cause the slats 28 to carry anything that may rest upon them rearwardly to the basket of the fender, which may be of the usual construction.

While I have illustrated one convenient form in which my invention may be embodied, it is to be understood that changes and modifications may be made therein without departing from the spirit of my invention.

What I claim and desire to secure by Letters Patent is:

1. In a car fender, supports therefor permitting a vertical movement of the forward end of the fender, a rotating crank-rod and pivotal supports therefor at the front of the fender, and a connection from the crank-rod to the fender-supporting means, whereby the fender is released and automatically lowered when the crank-rod is rotated.

2. In a car fender, means for suspending the same, tripping means for releasing the fender, including a rotating crank-rod pivotally mounted on the front of the fender actuated by impact for releasing said tripping means and lowering the fender.

3. In a car fender, a trigger, a trigger-support, a stop, a suspending cord attached to said trigger-support, and a crank-rod connected to said trigger.

4. In a car fender, means for suspending the same, tripping means for releasing the fender, a crank-rod actuated by impact for releasing said tripping means and lowering the fender, and a conveyer.

5. In a car fender, a fender body, a crank-rod attached to the forward part thereof and adapted to turn, a trigger attached thereto, a swinging support for said rod and trigger, a stop, and a suspending device for the forward part of the fender attached to said swinging support, whereby, upon the turning of the crank-rod the trigger is freed, releasing the forward part of the fender.

6. In a car fender, a fender body, a crank-rod attached to the forward part thereof and adapted to turn, a trigger attached thereto, a swinging support for said rod and trigger, a stop, a suspending device for the forward part of the fender attached to said swinging support, and a conveyer, operated by contact with the ground, carrying objects rearwardly.

7. In a car fender, a fender body, a connection to the car permitting a vertical movement of the forward end, a crank-rod at the forward end adapted to turn, a trigger connected thereto, a swinging support for said rod and trigger, a stop for the trigger, a suspending cord attached to the swinging support, spur gears adapted to be operated by the ground upon the release of the fender, and a conveyer actuated by said spur gears.

8. In a car fender, means for suspending the same, tripping mechanism for releasing said fender, including a crank-rod, and means for withdrawing the crank-rod also released by the operation of said tripping mechanism.

9. In a car fender, means for suspending the same, tripping mechanism for releasing and lowering the fender, including a projecting member actuated by impact, and means for withdrawing said projecting member, also released by the operation of said tripping mechanism.

10. In a car fender, a swinging frame at the forward part of the fender body, suspending means attached to said swinging frame, a trigger in said swinging frame, a stop in the fender body adapted to coöperate therewith, a crank-arm in said swinging frame adapted to actuate said trigger, all arranged and combined so that upon the operation of the trigger the fender is lowered and the swinging frame is swung rearwardly.

11. In a car fender, a swinging frame at the forward part of the fender body, suspending means attached to said swinging frame, a trigger in said swinging frame, a stop in the fender body adapted to coöperate therewith, a crank-arm in said swinging frame adapted to actuate said trigger, all arranged and combined so that upon the operation of the trigger the fender is lowered and the swinging frame is swung rearwardly, a conveyer, and means for causing the same to move rearwardly when the fender is released.

In testimony whereof, I have hereunto set my hand in the presence of two subscribing witnesses.

GEORGE HEBER CARTER.

Witnesses:
JOHN T. SHERLOCK,
ADOLPH F. DINSE.